W. R. WILSON.
HUB STRUCTURE.
APPLICATION FILED JAN. 20, 1919.
1,330,829.
Patented Feb. 17, 1920.
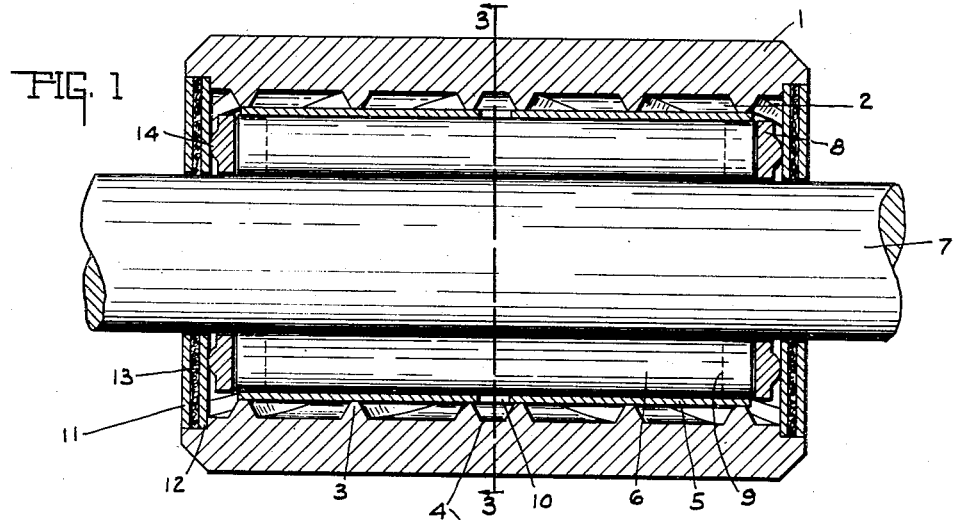
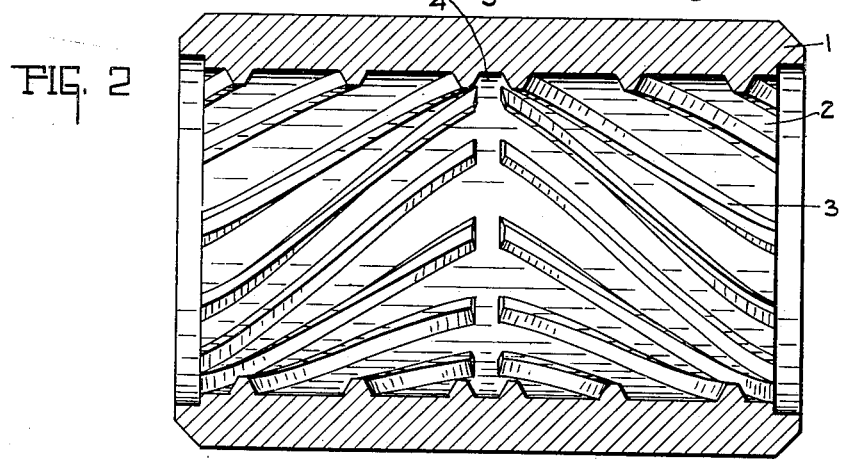
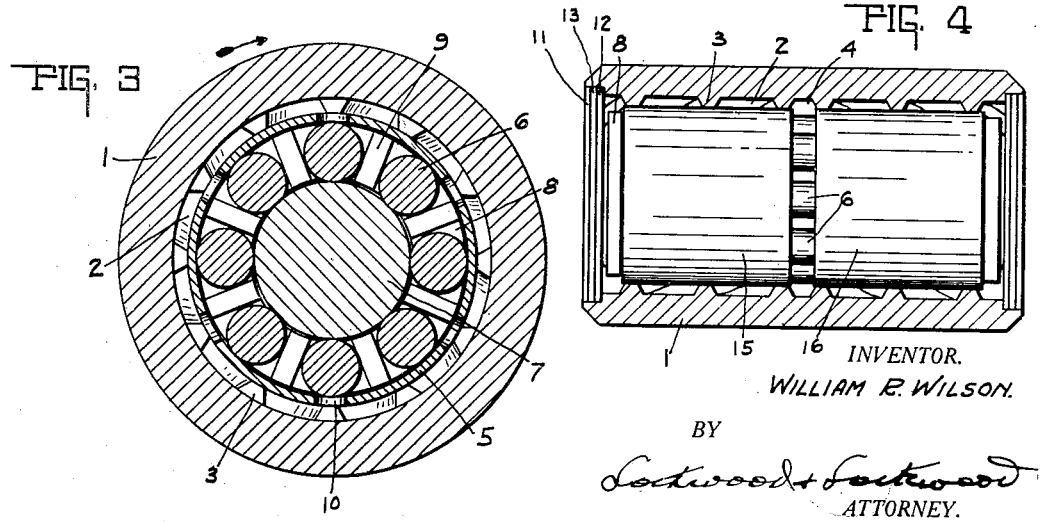
INVENTOR.
WILLIAM R. WILSON.
BY
Lockwood & Lockwood
ATTORNEY.

UNITED STATES PATENT OFFICE.

WILLIAM R. WILSON, OF TERRE HAUTE, INDIANA.

HUB STRUCTURE.

1,330,829. Specification of Letters Patent. Patented Feb. 17, 1920.

Application filed January 20, 1919. Serial No. 272,051.

*To all whom it may concern:*

Be it known that I, WILLIAM R. WILSON, a citizen of the United States, and a resident of Terre Haute, county of Vigo, and State of Indiana, have invented a certain new and useful Hub Structure; and I do hereby declare that the following is a full, clear, and exact description thereof, reference being had to the accompanying drawings, in which like letters refer to like parts.

This invention relates to an oiling device for wheel hubs, bearings or the like, and the prime feature of the invention is the provision of means within the hub for carrying the lubricant from the ends of the hub to the central portion thereof as the hub rotates.

A further feature of the invention is the provision of a channel or passage way at the longitudinal center of the hub in which the lubricant collects as it moves from the ends of the hub to the central portion thereof.

A further feature of the invention is the provision of a bushing or bushings within the hub in which are positioned bearing rollers, said bushing being spaced apart or having openings therethrough, which are in alinement with the channel within the hub, through which the lubricant passes to the interior of the bushing.

A further feature of the invention is the provision of means for retaining the bearing rollers within the bushing and holding the same in spaced relation around the axle.

A further feature of the invention is the provision of means for closing and sealing the ends of the hub to prevent the passage of lubricant from the hub.

Other objects and advantages will be hereinafter more fully set forth and pointed out in the accompanying specification.

In the accompanying drawings which are made a part of this application, Figure 1 is a central longitudinal sectional view through a hub showing the improved oiling mechanism applied thereto. Fig. 2 is a similar view with the bearing rollers and bushing removed. Fig. 3 is a sectional view as seen on line 3—3, Fig. 1. Fig. 4 is a longitudinal sectional view through a hub showing a bushing formed in two sections.

Referring to the drawings in which similar reference numerals designate corresponding parts throughout the several views, 1 indicates a hub which may be of any improved structure and having a longitudinally extending bore 2, on the wall of which are disposed a plurality of spirally disposed ribs 3. The ribs 3 extend from the ends of the hub to points adjacent the longitudinal center thereof and the trend of the ribs are in the same direction so that when the hub rotates, the lubricant will be carried from the ends of the hub to the central portion thereof. The inner ends of the ribs terminate a short distance from each other and form a channel or passage 4 into which the lubricant collects as the hub rotates, the formation of the ribs causing the lubricant to gradually flow into the channel.

Disposed within the bore 2 of the hub and resting upon the inner edges of the ribs 3 is a bushing 5 in which are placed a plurality of bearing rollers 6, for engagement with the axle or spindle 7, the bearing rollers being of such diameter as to simultaneously contact with the bushing and axle. The bearing rollers 6 are held within the bushing 5 by means of retainers 8, which are in the form of a ring, one at each end of the bushing, the inner faces of the retainers having inwardly extending fingers 9, which hold the bearing rollers 6 in spaced relation. The bushing 5 is provided with a plurality of openings 10 at its longitudinal center which register with the channel 4 in the hub, so that as the lubricant collects in said channel it will flow through said openings and come in contact with the bearing rollers, the lubricant gradually working to the ends of the bushing from whence it discharges into the bore 2 and is again taken up by the ribs and carried to the longitudinal center of the hub, the bushing being slightly less in length than the hub, so that the lubricant, upon descending, will be taken up by the ribs.

The ends of the hub are preferably sealed or closed by means of disks 11, which fit within the ends of the bore and abut against the shoulders 12, so as to limit the inward movement of the disks, and if preferred, a layer 13 of fabric may be placed between the disks to prevent leakage of the lubricant around the axle. The inner disks 11 also serve to hold the retainers 8 in position, said retainers having circular ribs 14, which engage the inner faces of the inner disks.

In operation the hub is provided with the prescribed quantity of lubricant and when rotating in the direction indicated by the arrow in Fig. 3 the spirally disposed ribs 3 will cause the lubricant to flow to the longitudinal center of the hub and be discharged into the channel 4 from whence it passes through the openings 10 into the interior of the bushing 5. The rotation of the bearing rollers 6 will cause the lubricant to spread over all parts of the bearing rollers and the face of the axle and likewise cause the flow to travel toward the ends of the bushing from whence it will discharge and descend into the bore 2 at the outer ends thereof. The lubricant so discharged will then be collected by the spirally disposed ribs and again be conveyed to the center of the hub, thereby forming a continuous circulation of the lubricant from the ends to the center of the tub and from the center of the bushing to the ends thereof.

Instead of making the round openings as shown at 10 they may be made oblong so that but a narrow strip of metal is left connecting the two ends of the bushing, or, if preferred, the bushing may be made in two sections, as shown at 15 and 16 in Fig. 4. In the latter construction a space is left between the two ends of the bushing and entirely around the interior of the hub for the passage of the lubricant.

The invention claimed is:

1. A hub structure having a plurality of spirally disposed ribs therein, adapted to move lubricant from the ends of the hub structure to the central portion thereof and a passageway through said ribs for permitting the lubricant to pass around said structure.

2. A hub structure having spirally disposed ribs therein adapted to move lubricant from the ends of the hub to the central portion thereof, the ends of said ribs being spaced apart at the longitudinal center of the hub to form a peripheral passageway.

3. A hub structure having series of spirally disposed ribs extending inwardly from its ends to a point adjacent the longitudinal center of the hub, the meeting ends of said series of ribs being spaced apart to form a peripheral passageway within the hub structure.

4. The combination with a hub structure having series of ribs projecting inwardly from the ends thereof, the meeting ends of the series of ribs being spaced apart to form a passageway, of a bushing within the hub structure and closely fitting said ribs, said bushing having an opening in line with said passageway to permit the passage of lubricant to the interior of the bushing.

5. The combination with a hub structure having a plurality of spirally disposed ribs extending inwardly from the opposite ends thereof, the meeting ends of the ribs being spaced apart to form a passageway for lubricant, of a bushing fitting within said ribs and having a peripheral passageway in registration with the passageway between the bushing, whereby lubricant will pass within the bushing.

6. The combination with an axle, and a plurality of bearing rollers surrounding the axle, of a bushing surrounding said bearing rollers, a hub structure surrounding said bushing, and a plurality of spirally disposed ribs between the hub and the bushing adapted to cause lubricant to move from the ends of the hub to the center thereof, said bushing having a passageway at its longitudinal center for the admission of lubricant to the interior of the bushing.

7. The combination with an axle, a plurality of bearing rollers surrounding the axle, and means to retain the bearing rollers in spaced relation, of a bushing surrounding said rollers having openings at its longitudial center, a hub structure surrounding the bushing, a plurality of spirally disposed ribs between the bushing and the hub structure adapted to move lubricant from the ends of the hub structure to the central portion thereof, and means to seal the ends of the hub structure.

In witness whereof, I have hereunto affixed my signature.

WILLIAM R. WILSON.